(12) United States Patent
Ottikkutti et al.

(10) Patent No.: US 11,920,535 B2
(45) Date of Patent: Mar. 5, 2024

(54) APPARATUSES, METHODS, SYSTEMS, AND TECHNIQUES OF MISFIRE DETECTION USING ENGINE SPEED SENSOR

(71) Applicant: Cummins Inc., Columbus, IN (US)

(72) Inventors: Pradheepram Ottikkutti, Pune (IN); Yusuf Poonawala, Pune (IN); Shailesh Nair, Pune (IN); Pravin A. Suryawanshi, Pune (IN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/819,704

(22) Filed: Aug. 15, 2022

(65) Prior Publication Data
US 2022/0389881 A1 Dec. 8, 2022

Related U.S. Application Data

(63) Continuation of application No. PCT/US2021/017573, filed on Feb. 11, 2021.

(51) Int. Cl.
*F02D 41/14* (2006.01)
*F02D 41/00* (2006.01)
*F02D 41/22* (2006.01)

(52) U.S. Cl.
CPC ..... *F02D 41/1498* (2013.01); *F02D 41/0097* (2013.01); *F02D 41/22* (2013.01); *F02D 2200/101* (2013.01); *F02D 2200/1012* (2013.01)

(58) Field of Classification Search
CPC .. F02D 41/1498; F02D 41/0097; F02D 41/22; F02D 2200/101; F02D 2200/1012; F02D 2200/1015; F02D 2041/228
See application file for complete search history.

(56) References Cited

U.S. PATENT DOCUMENTS

| 5,506,778 | A | * | 4/1996 | Matsumoto ......... F02D 41/1498 |
| | | | | 701/111 |
| 5,841,025 | A | | 11/1998 | Remboski et al. |
| 5,906,651 | A | | 5/1999 | Amano |
| 6,591,666 | B1 | | 7/2003 | Kacewicz et al. |
| 8,027,782 | B2 | | 9/2011 | Assf et al. |
| 8,136,390 | B2 | | 3/2012 | Arakawa |

(Continued)

FOREIGN PATENT DOCUMENTS

| CN | 107218099 | 9/2017 |
| CN | 111691946 | 9/2020 |

(Continued)

OTHER PUBLICATIONS

International Search Report and Written Opinion, PCT Appln. No. PCT/US21/017573, dated Jun. 4, 2021, 18 pgs.

*Primary Examiner* — George C Jin
(74) *Attorney, Agent, or Firm* — Taft, Stettinius & Hollister LLP

(57) ABSTRACT

A system includes a reciprocating piston engine configured to output torque to drive a load. The system includes an engine speed sensor operatively coupled with the engine and configured to output an engine speed signal. The system includes an electronic control system operatively coupled with the powertrain. The electronic control system is configured to determine an engine acceleration in response to the engine speed signal, and detect a misfire of the engine in response to the engine acceleration.

28 Claims, 12 Drawing Sheets

(56) References Cited

U.S. PATENT DOCUMENTS

| | | | |
|---|---|---|---|
| 8,601,862 B1* | 12/2013 | Bowman | F02D 41/1498 |
| | | | 73/114.04 |
| 9,038,445 B2* | 5/2015 | Ito | G01M 15/11 |
| | | | 73/114.02 |
| 9,097,196 B2 | 8/2015 | Buslepp et al. | |
| 9,951,703 B2 | 4/2018 | Pathan et al. | |
| 10,358,992 B2 | 7/2019 | Sugimoto | |
| 10,502,659 B2* | 12/2019 | Katayama | F02D 41/1498 |
| 2005/0028894 A1 | 2/2005 | Hoffmann et al. | |
| 2010/0288035 A1 | 11/2010 | Arakawa | |
| 2014/0020655 A1* | 1/2014 | Ito | F02D 41/22 |
| | | | 123/339.1 |
| 2017/0101956 A1* | 4/2017 | Younkins | F02D 41/1401 |
| 2019/0177819 A1 | 6/2019 | Hagari | |
| 2022/0389881 A1* | 12/2022 | Ottikkutti | F02D 41/22 |

FOREIGN PATENT DOCUMENTS

| | | |
|---|---|---|
| CN | 111706417 | 9/2020 |
| DE | 102010036146 | 12/2017 |
| DE | 102012215176 | 12/2017 |
| DE | 102017127725 | 6/2018 |
| WO | 2009048519 | 4/2009 |

\* cited by examiner

APPARATUSES, METHODS, SYSTEMS, AND TECHNIQUES OF MISFIRE DETECTION USING ENGINE SPEED SENSOR

RELATED APPLICATIONS

The present application is a continuation of PCT Application No. PCT/US21/17573 filed on Feb. 11, 2021 which claims the benefit of and priority to Indian patent application no. 202031006538 filed Feb. 14, 2020, the disclosures of which is hereby incorporated by reference.

TECHNICAL FIELD

The present application relates to controls for reciprocating piston engines and to apparatuses, methods, systems, and techniques of misfire detection using an engine speed sensor.

BACKGROUND

Reciprocating piston internal engines may experience a number of malfunctions such as injector failure, misaligned valve mechanisms, stuck valves, or compression failure that can cause a cylinder to misfire and produce no power or mistimed power. Due to such malfunction, engines may face a loss of performance, repair cost, and downtime due to progressive damage. Additionally, such malfunctions may result in engine non-compliance with emissions limits which may mandate limits on the occurrence of misfire and/or resulting emissions. A number of proposals have been made for detecting engine misfire. Existing proposals suffer from a number of disadvantages and shortcomings. For example, certain proposals require the use of multiple sensors such as exhaust manifold pressure, exhaust manifold temperature sensors, and/or accelerometers. Existing proposals also do not indicate a cause for a detected misfire requiring a service technician to correlate multiple data points to troubleshoot the issue and identify appropriate corrective action. Existing proposals may also require steady state operation or specific operating routines that interfere with otherwise desired engine operation to detect misfire. Existing proposals are also not sufficiently accurate to allow an online course correction during transient operation. Existing proposals, such as exhaust manifold pressure based misfire detection, have low fidelity in low speed-low load regions, sometimes requiring multiple sensors and may also be negatively impacted by air handling noise factors like thermal management events, exhaust gas recirculation, and altitude variation.

DISCLOSURE OF EXAMPLE EMBODIMENTS

For the purposes of clearly, concisely and exactly describing example embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Example embodiments include unique apparatuses, methods, systems, and techniques to detect misfire events in a reciprocating internal combustion engine using an engine crankshaft speed sensor. Further embodiments, forms, objects, features, advantages, aspects, and benefits shall become apparent from the following description and drawings.

DETAILED DESCRIPTION OF EXAMPLE EMBODIMENTS

Figure 1:
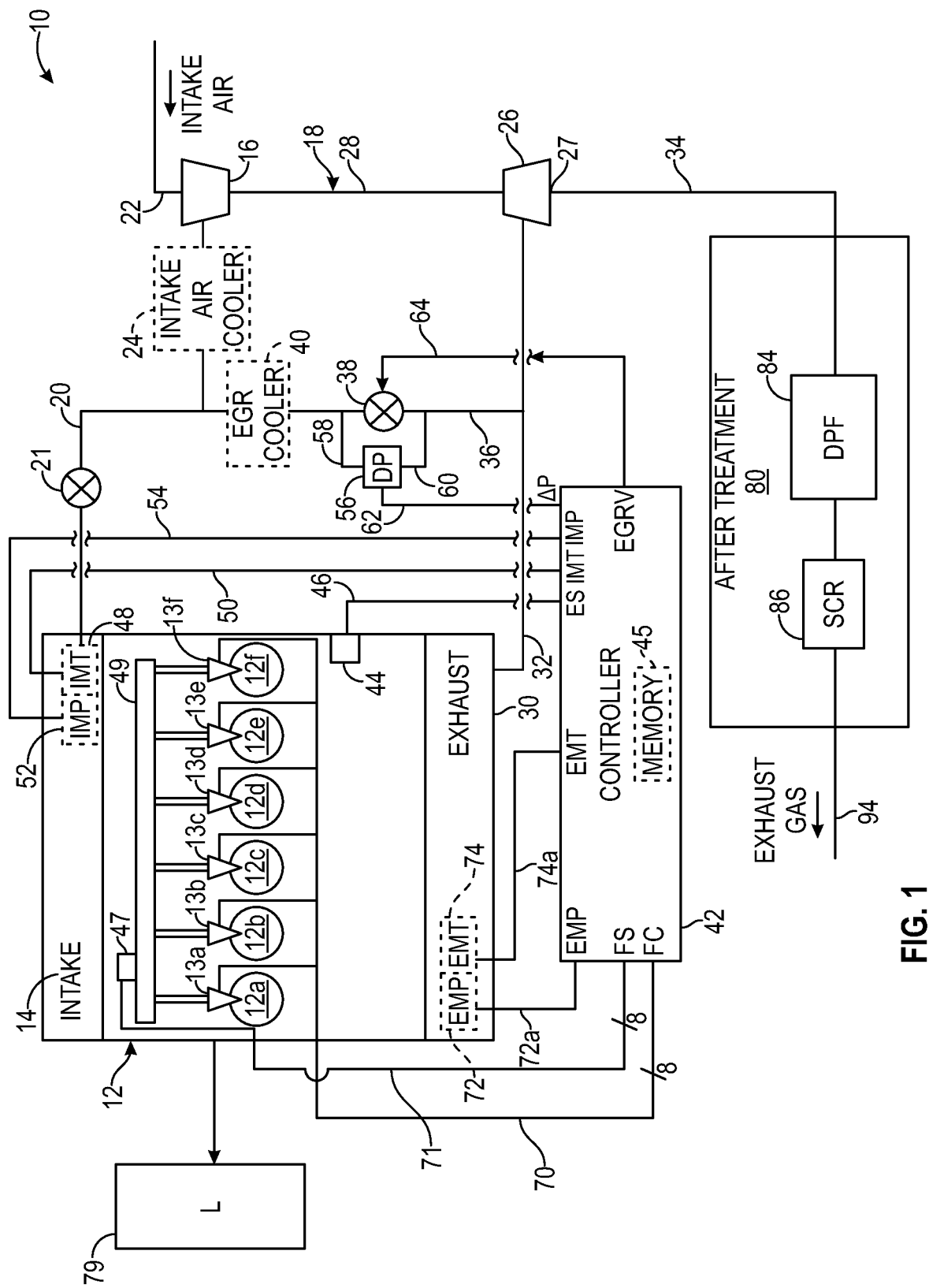
FIG. 1 is a schematic diagram illustrating certain aspects of an example engine system.

With reference to FIG. 1, there are illustrated certain aspects of an example powertrain system 10 (also referred to as system 10). In the illustrated embodiment, system 10 includes an internal combustion engine 12 including an intake manifold 14 which is fluidly coupled to an outlet of a compressor 16 of a turbocharger 18 via an intake conduit 20. Compressor 16 includes a compressor inlet coupled to an intake conduit 22 for receiving fresh air therefrom. The compressor 16 is mechanically coupled to a turbine 26 via a drive shaft 28. The turbine 26 includes a turbine inlet fluidly coupled to an exhaust manifold 30 of engine 12 via an exhaust conduit 32. System 10 may include an intake air cooler 24 disposed in line with intake conduit 20 between compressor 16 and intake manifold 14. System 10 may also include an intake air throttle (IAT) 21. In other embodiments, the engine 10 may be of a naturally aspirated type and may omit turbocharger 18. In further embodiments, the engine 10 may be of a supercharged type and one or more engine-driven compressors may be provided in lieu of exhaust-driven turbocharger 18.

In the illustrated embodiment the engine 12 is a reciprocating piston, direct injection, compression ignition engine configured to combust diesel fuel. It shall nevertheless be appreciated that the engine 12 may also be provided in other forms including one or more of port injection, spark ignition, and configured to combust other types of fuel such as natural gas or other gaseous fuel or gasoline. It shall be further appreciated that the teachings of the present disclosure may be implemented in connection with essentially any reciprocating piston engine.

The engine 12 includes a plurality of cylinders 12a-12f containing respective reciprocating pistons each connected to a crankshaft by a corresponding connecting rod (not shown) to reciprocally move within the respective cylinder 12a-12f in a standard manner for four-stroke engine operation. Each cylinder 12a-12f includes a combustion chamber with appropriate intake and exhaust valves (not shown) and fuel injectors 13a-13f. Fuel injectors 13a-13f are configured to operate in response to signals from electronic controls such as those further described herein. Fuel injectors 13a-13f receive fuel from a fuel source (not shown) in fluid communication therewith.

System 10 includes an EGR valve 38 disposed in-line with an EGR conduit 36 fluidly coupled at one end to intake conduit 20 and at an opposite end to exhaust conduit 32. An EGR cooler 40 may optionally be disposed in-line with EGR conduit 36 between EGR valve 38 and intake conduit 20 as shown in phantom in FIG. 1.

System 10 includes an electronic control system. In the illustrated form the electronic control system includes a controller 42 which may be provided as an electronic control unit (ECU) or an electronic control module (ECM). The electronic control system may further include additional controllers which may be provided as additional ECU or ECM units in communication with one another over a communication network such as a controller area network (CAN). In some embodiments, one or more parts or components of the electronic control system, for example, the controller 42, may be provided in the form of an electronic computing system of a diagnostic apparatus configured to be operatively coupled with an engine. In some such embodiments, the controller 42 or other electronic computing system components may receive information such as one or more additional signal(s) permitting the controller 42 or other electronic computing system components to evaluate or determine a cylinder firing sequence associated with an engine being diagnosed or otherwise under evaluation. Such information may comprise, for example, a signal from a crank "reference" marking sensor indicating an angle (e.g., an angle corresponding to top-dead-center (TDC), bottom-dead-center (BDC), or another angle for a given cylinder). Provision of such information to the controller 42 or other electronic computing system components may include translation or conversion of one or more signals to accomplish or facilitate the foregoing acts and capabilities.

The controller 42 is generally operable to control and manage operational aspects of engine 12. The controller 42 includes memory 45 as well as a number of inputs and outputs for interfacing with various sensors and systems coupled to engine 12. The controller 42 can be an electronic circuit comprised of one or more components, including digital circuitry, analog circuitry, or both. The controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or other arrangements. The controller 42 can include signal conditioners, signal format converters (such as analog-to-digital and digital-to-analog converters), limiters, clamps, filters, and the like as needed to perform various control and regulation operations described herein.

The controller 42 may be configured for regulation and control of the overall operation of the engine 12. Alternatively, controller 42 may be configured for regulation and control of a set of controlled aspects of engine 12. The controller 42 is configured to store controller executable instructions and to execute these instructions to provide for regulation and control of the engine 12. These controller executable instructions may be configured in accordance with one or more of the control processes described herein as well as other control processes.

The controller 42 is configured to receive a number of inputs for receiving signals from various sensors or sensing systems associated with system 10. For example, system 10 includes an engine speed sensor 44 electrically connected to an engine speed input, ES, of the controller 42 via signal path 46. Engine speed sensor 44 is operable to sense rotational speed of the engine 12 and produce an engine speed signal on signal path 46 indicative of engine rotational speed. Engine speed sensor 44 may be provided as a crankshaft speed sensor. In one embodiment, engine speed sensor 44 is a Hall effect sensor operable to determine engine speed. Alternatively, engine speed sensor 44 may be any other known sensor operable as just described including, but not limited to, a variable reluctance sensor or the like. System 10 further includes a fuel system sensor 47 electrically connected to fuel system input, FS, of the controller 42 via signal path 71. In the illustrated embodiment, fuel system sensor 47 is provided as a rail pressure sensor configured to sense a pressure associated with a fuel rail 49 configured to supply fuel to fuel injector 13a-13f.

System 10 may include an intake manifold temperature sensor 48 disposed in fluid communication with the intake manifold 14 of engine 12, and electrically connected to an intake manifold temperature input (IMT) of the controller 42 via signal path 50. Intake manifold temperature sensor 48 is operable to provide a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 may also include an intake manifold pressure sensor 52 disposed in fluid communication with intake manifold 14 and electrically connected to an intake manifold pressure input (IMP) of the controller 42 via signal path 54. Alternatively, pressure sensor 52 may be disposed in fluid communication with intake conduit 20. In any case, pressure sensor 52 is operable to produce a pressure signal on signal path 54 indicative of air pressure within intake conduit 20 and intake manifold 14.

System 10 may also include an exhaust manifold pressure sensor 72 disposed in fluid communication with exhaust manifold 30 and electrically connected to an exhaust manifold pressure input (EMP) of the controller 42 via signal path 72 a. In other forms, pressure sensor 72 may be disposed in the fluid communication with exhaust conduit 32. Pressure sensor 72 is operable to produce a pressure signal on signal path 72 indicative of gas pressure within exhaust conduit 32 and exhaust manifold 30. In other forms, one or both of exhaust manifold pressure sensor 72 and exhaust manifold temperature sensor 74 may be absent from system 10, and exhaust pressure and temperature may be calculated or estimated from other parameters. For example, in forms where the exhaust manifold pressure sensor is absent exhaust manifold pressure may be calculated or estimated using a number of techniques or models such as via the speed density equation or by other calculations or estimations.

System 10 may include a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of the controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

The controller 42 is also configured to provide a number of outputs for controlling one or more engine functions associated with system 10. For example, EGR valve 38 is electrically connected to an EGR valve output (EGRV) of controller 42 via signal path 64. The controller 42 is operable, as is known in the art, to produce an EGR valve control signal on signal path 64 to correspondingly control the position of EGR valve 38 relative to a reference position in a known manner. The controller 42 is accordingly operable to control EGR valve 38 to selectively provide a flow of recirculated exhaust gas from exhaust manifold 30 to intake manifold 14. Accordingly, while the composition of gas flowing along pathway 33 changes from (a) compressed air, (b) to an air/fuel charge, and then (c) to exhaust—when EGR valve 38 is closed—such composition may also include various amounts of recirculated exhaust gas when EGR valve 38 is open. In certain embodiments, the controller 42 may also include one or more outputs for controlling operation of a turbocharger mechanism such as a wastegate for turbocharger 18 (if present) a variable geometry actuator (if present).

The controller 42 is further configured to provide a plurality of fueling command outputs for controlling operation of each fuel injector 13a-13f or to another number of fuel injectors where present in other embodiments and forms of system 10. The signal paths for outputs FC are also collectively designated by reference numeral 70 in FIG. 1; however, it should be understood that the timing of fuel injected by each injector 13a-13f can be independently controlled with controller 42. In addition to the timing of fuel injection, the controller 42 can also regulate the amount of fuel injected. Typically, the fuel amount varies with the number and duration of injector-activating pulses provided to injectors 13a-13f.

The system 10 may also include an aftertreatment system 80 providing aftertreatment of exhaust gases before discharge through a conduit 94. During engine operation, exhaust gas flows from turbine outlet 27 through exhaust conduit 34 in fluid communication therewith. Conduit 34 is also in fluid communication with aftertreatment system 80 which receives the exhaust gas from turbine 26 for aftertreatment. Aftertreatment system 80 can include a number of catalysts configured to chemically convert and/or remove undesirable constituents from the exhaust stream before discharge into the environment. In the illustrated form, aftertreatment system 80 includes a diesel particulate filter (DPF) 84 configured to reduce emissions of particulates. The illustrated form of aftertreatment system 80 also includes a selective catalytic reduction (SCR) catalyst 86 configured to catalyze the reduction of oxides of nitrogen (NOx) in conjunction with a reducing agent such as diesel exhaust fluid (DEF) which is introduced into the exhaust stream by a doser or injector (not shown) typically upstream of the SCR catalyst 86. In other embodiments, aftertreatment system 80 may include additional or alternative catalysts including, for example, oxidation catalysts and ammonia slip catalysts, and other catalysts as would occur to one of skill in the art with the benefit of the present disclosure.

For nominal operation, the temperature of one or more portions of aftertreatment system 80 may need to achieve certain temperature conditions. For example, the SCR catalyst 84 may need to achieve a minimum temperature in order to operate as intended or desired. Additionally, for certain regeneration modes, even higher temperatures need to be reached from time-to-time. For example, the DPF 84 may require elevated temperature for periodic regeneration to eliminated accumulated particulate matter.

System 10 is configured to drive a load 79. In some embodiments, system 10 may be configured to propel a vehicle and the load L may be a propulsion load imposed on a driveline operatively coupled with system 10 including a number of load components such as aerodynamic resistance, rolling resistance, and grade/gravitational resistance to name several examples. The driveline operatively coupled with system 10 may include, for example, a transmission, a drive shaft, a differential, and drive wheels. In some embodiments, the load 79 may be a generator, and system 10 may be configured as a generator set. In other embodiments, load L may comprise a pump, compressor, or another type of load as will occur to one of skill in the art with the benefit of the present disclosure.

Figure 2A:
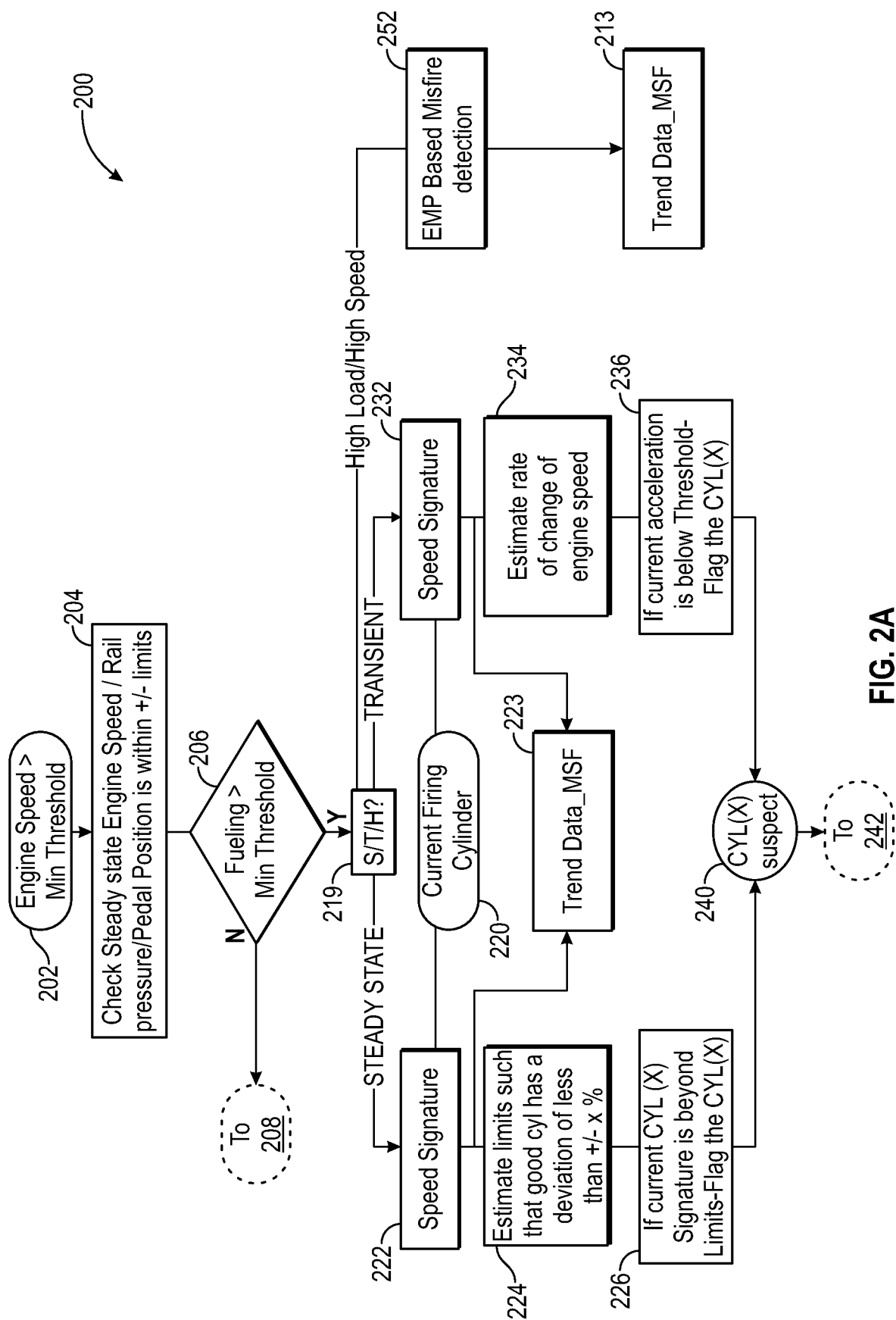
FIGS. 2A-2C are flow diagrams illustrating certain aspects of example engine diagnostics.
Figure 2B:
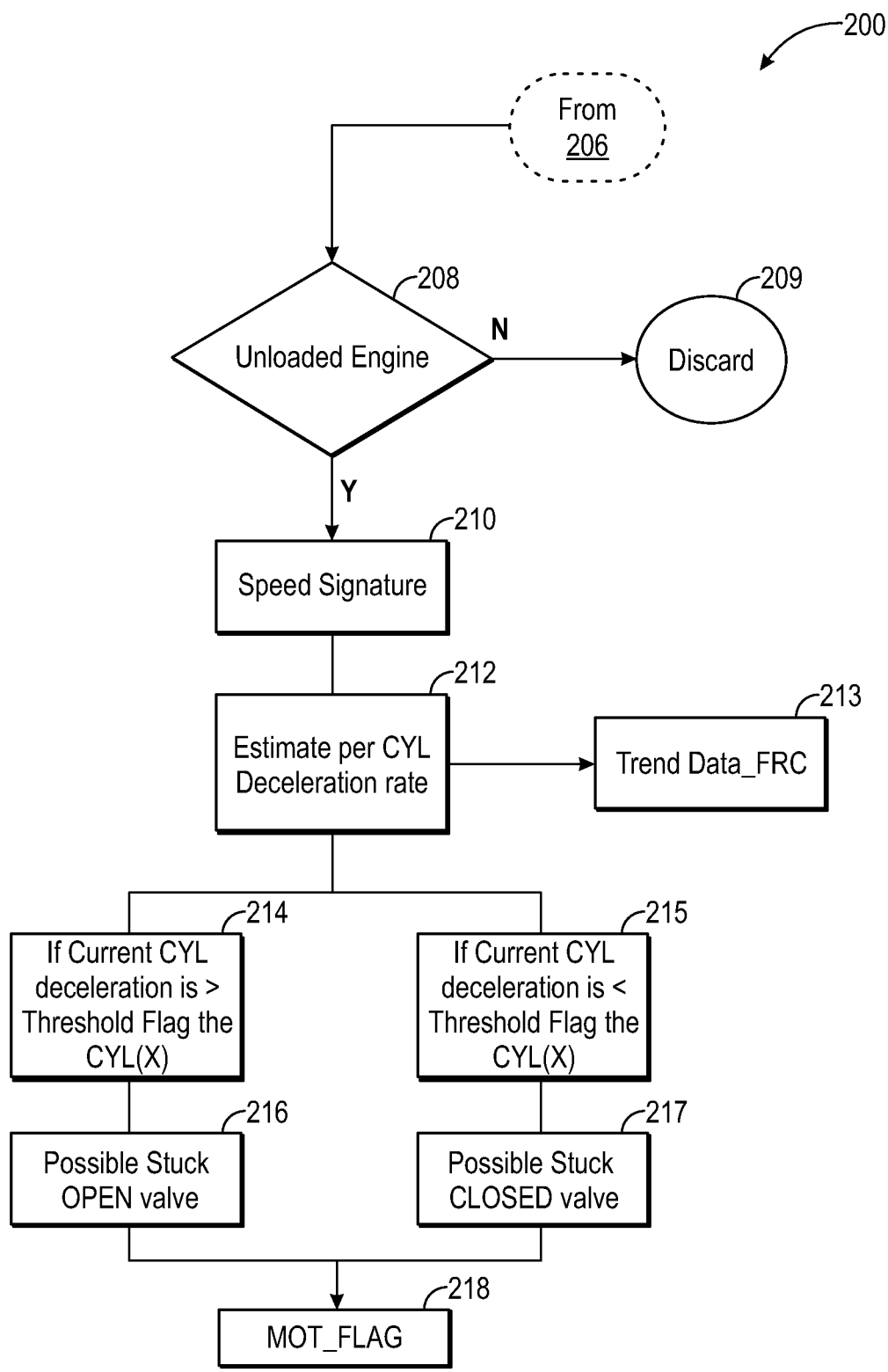
Figure 2C:
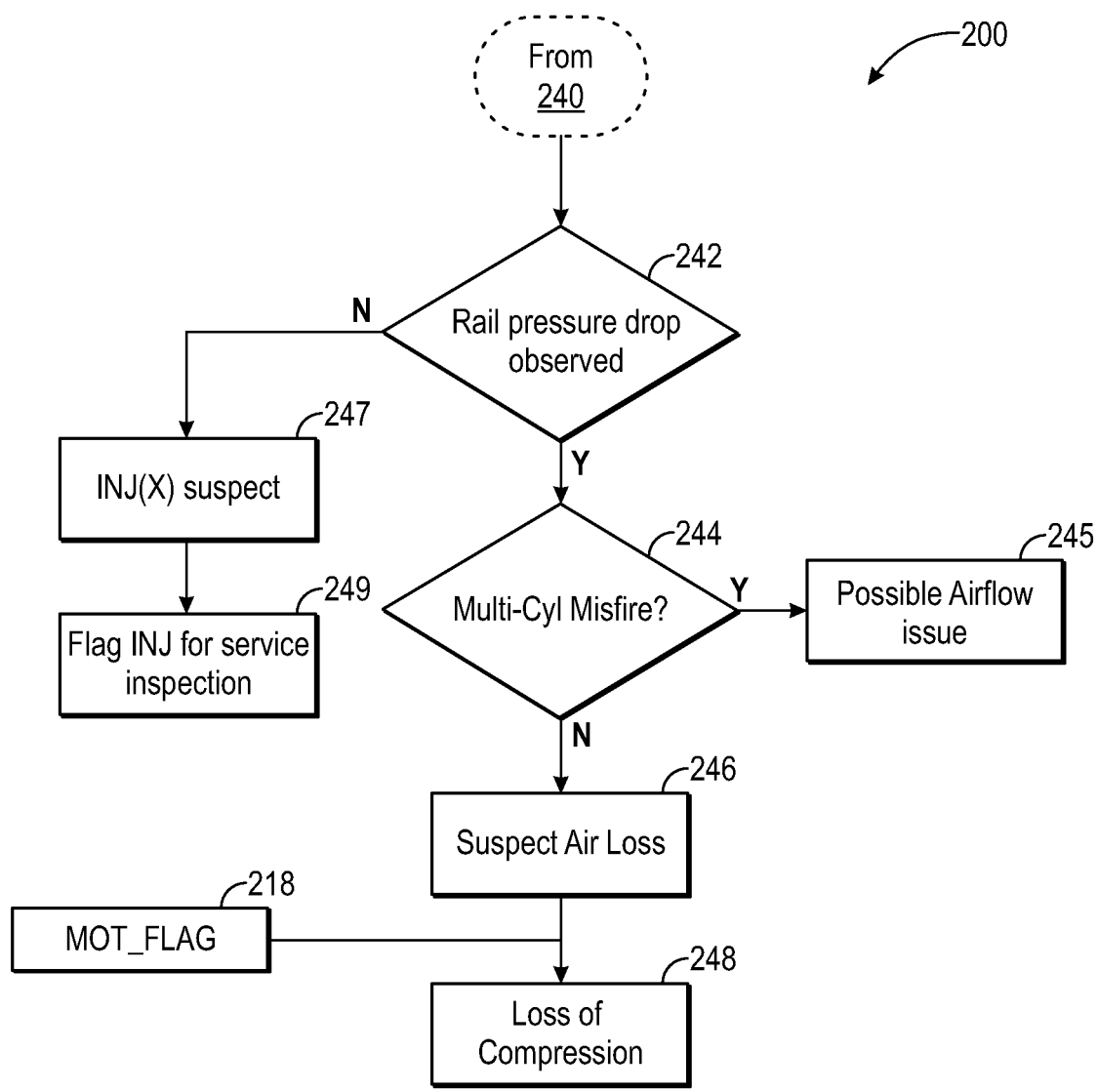

With reference to FIGS. 2A-2C there are illustrated certain aspects of an example engine misfire diagnostic process 200 which may be implemented and executed in connection with one or more components of an electronic control system associated with an engine system, for example, the controller 42 of system 10 described in connection with FIG. 1 or one or more alternative or additional components of an electronic control system.

After being initiated, process 200 proceeds to operation 202 which evaluates whether an engine speed (e.g., an engine speed signal received from an engine speed sensor) satisfies a minimum threshold condition. If the engine speed does not satisfy the minimum threshold condition, process 200 may repeat operation 202 or may terminate and be later started or initiated. If the engine speed satisfies the minimum threshold condition, process 200 proceeds to operation 204.

Operation 204 evaluates whether a steady state engine speed, a fuel system pressure (e.g., a fuel system rail pressure) and an accelerator pedal position satisfy minimum and/or maximum magnitude conditions. If the foregoing conditions are not satisfied, process 200 may repeat operation 204 or may terminate and be later started or initiated. If the foregoing conditions are satisfied, process 200 proceeds to operation 206.

Operation 206 evaluates whether an engine fueling value satisfies a minimum threshold condition. If the engine fueling value does not satisfy the minimum threshold condition, process 200 proceeds to operation 208. If the engine fueling value satisfies the minimum threshold condition, process 200 proceeds to operation 219.

Operation 208 evaluates whether an unloaded engine condition is satisfied (e.g., the engine is motoring or being passively driven by an external load). If the unloaded engine condition is not satisfied, process 200 proceeds to operation 209 which discards the present data and returns to operation 202 or ends process 200 or terminates process 200 which may be later started or initiated. If the unloaded engine condition is satisfied, process 200 proceeds to operation 210.

Operation 210 receives an input 220 indicating the current cylinder in the firing order and determines a cylinder-specific or per-cylinder engine speed signature in response to an engine speed signal output by an engine speed sensor operatively coupled with the engine. The engine speed signature comprises an engine speed associated with a firing event of a particular cylinder under evaluation. Operation 210 may be performed for each of a plurality of cylinders of an engine to determine an engine speed signature for each of a plurality of cylinders of an engine and may be performed in a sequence corresponding to the firing order of the plurality of cylinders, in parallel for multiple cylinders, or combinations thereof such as a sequence of parallel evaluations. From operation, 210, process 200 proceeds to operation 212.

Operation 212 determines a cylinder-specific or per-cylinder deceleration (negative acceleration) for the currently firing cylinder and evaluates the deceleration relative to an upper limit and a lower limit. The deceleration is associated with a firing event of a particular cylinder under evaluation. Operation 212 may be performed for each of a plurality of cylinders of an engine to determine a deceleration for each of a plurality of cylinders of an engine and may be performed in a sequence corresponding to the firing order of the plurality of cylinders, in parallel for multiple cylinders, or combinations thereof such as a sequence of parallel evaluations. The evaluation performed by operation 212 may occur in a sequence corresponding to the firing order of the plurality of cylinders, in parallel for multiple cylinders, or combinations thereof such as a sequence of parallel evaluations.

The results of the evaluation performed by operation 212 may be stored in cylinder friction trend data set 213 for use in prognostic or predictive maintenance evaluations. If the cylinder deceleration for a cylinder under evaluation is greater than a maximum limit, process 200 proceeds to operation 214 which flags the cylinder under evaluation. Process 200 then proceeds to operation 216 which establishes a possible valve stuck open condition and to operation 218 which sets a flag according to the possible valve stuck open condition.

If the cylinder deceleration for a cylinder under evaluation is less than a minimum limit, process 200 proceeds to operation 215 which flags the cylinder under evaluation. Process 200 then proceeds to operation 217 which establishes a possible valve stuck closed condition and to operation 218 which sets a flag according to the possible valve stuck closed condition.

If the engine fueling value evaluated by operation 206 satisfies the minimum limit condition, process 200 proceeds to operation 219 which evaluates whether the engine is operating in a steady state condition, a transient condition, or a high-load and high-speed condition. Operation 219 may determine that the engine is operating in a steady state condition if the rate of change in engine speed or engine acceleration is zero or below a predetermined limit. The predetermined limit may be a steady state engine speed (rpm) regulation limit, for example, +/−5 rpm, it being appreciated that the limit may vary for other applications. Operation 219 may determine that the engine is operating in a transient condition when engine speed variation or acceleration is non-zero or above the predetermined limit. Operation 219 may determine that the engine is operating in a high-load and high-speed condition in response to engine speed exceeding a high-speed threshold and the engine load exceeding a high-load threshold.

If operation 219 evaluates that the engine is operating at a steady state condition, process 200 proceeds to operation 222. Operation 222 receives an input 220 indicating the currently firing cylinder and determines a cylinder-specific or per-cylinder engine speed signature in response to an engine speed signal output by an engine speed sensor operatively coupled with the engine. The engine speed signature comprises an engine speed associated with a firing event of a particular cylinder under evaluation. Operation 222 may be performed for each of a plurality of cylinders of an engine to determine an engine speed signature for each of a plurality of cylinders of an engine and may be performed in a sequence corresponding to the firing order of the plurality of cylinders, in parallel for multiple cylinders, or combinations thereof such as a sequence of parallel evaluations. The speed signature determined by operation 222 may be stored in misfire trend data set 223 for use in prognostic or predictive maintenance evaluations. From operation, 222, process 200 proceeds to operation 224.

Operation 224 determines an upper limit and a lower limit for an engine speed of a good (non-malfunctioning) cylinder (e.g., +/−a predetermined magnitude or percentage). From operation 224, process 200 proceeds to operation 226 which evaluates the engine speed for a currently firing cylinder relative to the upper limit and a lower limit. Operation 226 may be performed for each of a plurality of cylinders of an engine and may be performed in a sequence corresponding to the firing order of the plurality of cylinders, in parallel for multiple cylinders, or combinations thereof such as a sequence of parallel evaluations.

If operation 226 evaluates that the engine speed for a currently firing cylinder is outside the upper limit or the lower limit it flags the cylinder under evaluation as potentially malfunctioning and process 200 proceeds to operation 240 which proceeds with further evaluation of the cylinder flagged as potentially malfunctioning.

If operation 219 evaluates that the engine is operating in a transient condition, process 200 proceeds to operation 232. Operation 232 receives an input 220 indicating the currently firing cylinder and determines a cylinder-specific or per-cylinder engine speed signature in response to an engine speed signal output by an engine speed sensor operatively coupled with the engine. The engine speed signature comprises an engine speed associated with a firing event of a particular cylinder under evaluation. Operation 232 may be performed for each of a plurality of cylinders of an engine to determine an engine speed signature for each of a plurality of cylinders of an engine and may be performed in a sequence corresponding to the firing order of the plurality of cylinders, in parallel for multiple cylinders, or combinations thereof such as a sequence of parallel evaluations. The speed signature determined by operation 232 may be stored in misfire trend data set 223 for use in prognostic or predictive maintenance evaluations. From operation, 232, process 200 proceeds to operation 234.

Operation 234 determines a cylinder-specific or per-cylinder acceleration or rate of change of engine speed. The acceleration or rate of change of engine speed is associated with a firing event of a particular cylinder under evaluation. Operation 234 may be performed for each of a plurality of cylinders of an engine to determine acceleration or rate of change of engine speed for each of a plurality of cylinders of an engine and may be performed in a sequence corresponding to the firing order of the plurality of cylinders, in parallel for multiple cylinders, or combinations thereof such as a sequence of parallel evaluations. From operation 234, process 200 proceeds to operation 236 which evaluates the acceleration or rate of change of engine speed for a currently firing cylinder relative to an acceleration threshold. Operation 236 may be performed for each of a plurality of cylinders of an engine and may be performed in a sequence corresponding to the firing order of the plurality of cylinders, in parallel for multiple cylinders, or combinations thereof such as a sequence of parallel evaluations.

If operation 236 evaluates that the acceleration or rate of change of engine speed for a cylinder under examination is below the acceleration threshold it flags the cylinder under evaluation as potentially malfunctioning and processes 200 proceeds to operation 240 which proceeds with further evaluation of the cylinder flagged as potentially malfunctioning.

If operation 219 evaluates that the engine is operating in a high-load and high-speed condition, process 200 proceeds to operation 252 which performs an exhaust manifold pressure-based diagnostic effective to evaluate potential engine misfire. A person of skill in the art with the benefit of the present disclosure will appreciate that such diagnostics may be implemented in a variety of forms which evaluates exhaust manifold pressure information (e.g., information from exhaust manifold pressure sensor) relative to an expected exhaust manifold pressure or pressure profile for a non-misfire operation. The output of operation 252 may be stored in misfire trend data set 223 for use in prognostic or predictive maintenance evaluations.

It shall be appreciated that process 200 may proceed to operation 252 in combination with process 200 proceeding to operation 222 or 232, for example in embodiments which utilize an engine speed sensor in combination with an exhaust manifold pressure (EMP) sensor to complement an EMP-based misfire diagnostic. It shall be further appreciated that operation 252 may be omitted in certain embodiments.

From operation 240, process 200 proceeds to operation 242 which evaluates whether a fuel system pressure drop (e.g., a fuel rail pressure drop) is observed. Operation 242 may be performed for each of a plurality of cylinders of an engine and may be performed in a sequence corresponding to the firing order of the plurality of cylinders, in parallel for multiple cylinders, or combinations thereof such as a sequence of parallel evaluations. The fuel system pressure drop may be measured during the injection window of an injector associated with a cylinder under evaluation. The absence of an expected fuel system pressure drop may be taken as an indication of injector malfunction. Accordingly, if operation 242 evaluates that an expected rail pressure drop is not observed (e.g., no rail pressure drop is observed, or a pressure drop less than a threshold for an expected pressure drop is observed), process 200 proceeds to operation 247 which identifies an injector under evaluation as potentially malfunctioning and then proceeds to operation 249 which flags an injector under evaluation for inspection, testing, or service.

It shall be appreciated that the evaluation of a fuel system pressure drop may be omitted in certain embodiments, for example, in embodiments which do not have injectors associated with each cylinder, such as port injected engines or engines that introduce fuel at various locations upstream from the cylinders, for example, in the case of certain gaseous fuel engines or multi-fuel engines including gaseous fueling.

If operation 242 evaluates that an expected rail pressure drop is observed (e.g., a pressure drop is observed, or a pressure drop above a threshold for an expected pressure drop is observed), process 200 proceeds to operation 244 which evaluates whether a misfire condition is indicated for multiple cylinders. If operation 244 evaluates that a misfire condition is detected for multiple cylinders, process 200 proceeds to operation 245 which identifies a potential airflow malfunctioning and may also set one or more flags for inspection, testing, or service of one or more air handling components, such as a throttle, an EGR valve, an EGR cooler, a charge air cooler, or a turbocharger, among others.

If operation 244 evaluates that a misfire condition is not detected for multiple cylinders, process 200 proceeds to operation 246 which identifies a cylinder malfunction (e.g., a bad cylinder ring or piston ring. From operation 246, process 200 proceeds to operation 248 which also receives a value of a flag set by operation 218. If the output of operation 246 and the flag value set by operation 218 are both true, operation 248 identifies a cylinder malfunction and may also set one or more flags for inspection, testing, or service of a cylinder or its associated components.

Process 200 may perform a number of control operations in response to a misfire determination (e.g., in response to any of operations, 245, 246, 248, and 252). For example, in response to a misfire determination, process 200 may modify the operation of the engine, for example, by disabling one or more cylinder, limiting engine speed and/or engine torque, restricting engine operation to a limited range of an engine operating map, entering a limp-home mode, modifying a fuel injection parameter, or other operation modifications as would occur to one of skill in the art with the benefit of the present disclosure. Additionally or alternatively, in response to a misfire determination, process 200 may provide an operator perceptible output indicating the maintenance action, for example, illuminating a malfunction indicator lamp (MIL), setting a readable fault code, transmitting a fault indication.

Process 200 provides an example of controls implementable in a system and operable in a process in connection with a system including a reciprocating piston engine configured to output torque to drive a load, an engine speed sensor operatively coupled with the engine and configured to output an engine speed signal, and an electronic control system operatively coupled with the powertrain. Process 200 further provides an example of controls in which an electronic control system is configured to and/or operable to operate the engine to drive the load according to a load demand, and during operation of the engine to drive the load according to the load demand and to determine an engine acceleration in response to the engine speed signal and detect a misfire of the engine in response to the engine acceleration.

It shall be appreciated that the load demand may include a number of in-mission load demands including, for example, demand corresponding to an operator demand such as an accelerator pedal position, demand corresponding to a cruise control system command or request, demand corresponding to an automated driver assistance system command or request, demand corresponding to an autonomous or semi-autonomous vehicle control system command or request, demand corresponding to a load controller command or request such as an electrical power load controller command or request, a pump load controller command or request, or a compressor load controller command or request, and demand corresponding to combinations of the foregoing examples with one another and/or with other in-mission load demands.

It shall be further appreciated that providing or operating an electronic control system that is configured to and/or operable to operate the engine to drive the load according to a load demand, and during operation of the engine to drive the load according to the load demand and to determine an engine acceleration in response to the engine speed signal and detect a misfire of the engine in response to the engine acceleration may provide a number of desirable features. For example, such systems and methods may avoid the need to modify in-mission operation responsive to load demand in order to perform a test or diagnostic to detect misfire, for example, by requiring an engine to operate at a prescribed speed, load, or other operating conditions. Additionally, such systems and methods may permit determination of a misfire over a broad region of an engine operating map, for example, a range including low-speed, low-load operation, such as operation at or near (e.g., +/−5%) idle-speed and idle-load, a range including operation at or near (e.g., +/−5%) rated speed and rated load, a range including operation at or near (e.g., +/−5%) maximum speed and maximum load, a range including two or more of the foregoing ranges, a range including all of the foregoing ranges, a range including one or more of the foregoing ranges in combination with other ranges, and a range including two or more of the foregoing ranges in combination with other ranges.

From the foregoing description, it shall be further appreciated that process 200 provides an example of controls implementable and operable to detect the misfire during transient operation of the engine. Process 200 also provides an example of controls implementable and operable to identify a cause of the misfire, for example, to distinguish between (a) an injector malfunction, (b) an airflow malfunction, and (c) a compression malfunction as the cause of the misfire. Process 200 provides an example of controls implementable and operable to detect misfire in response to an output of an engine speed sensor in one of a peak and a valley of an engine speed signal provided by the engine speed sensor. Process 200 provides an example of controls implementable and operable to detect the misfire in response to a single engine speed measurement for each cylinder cycle. The single engine speed signal may correspond to a valley of an engine speed signal. The single engine speed signal may alternatively correspond to a peak of an engine speed signal.

Figure 2D:
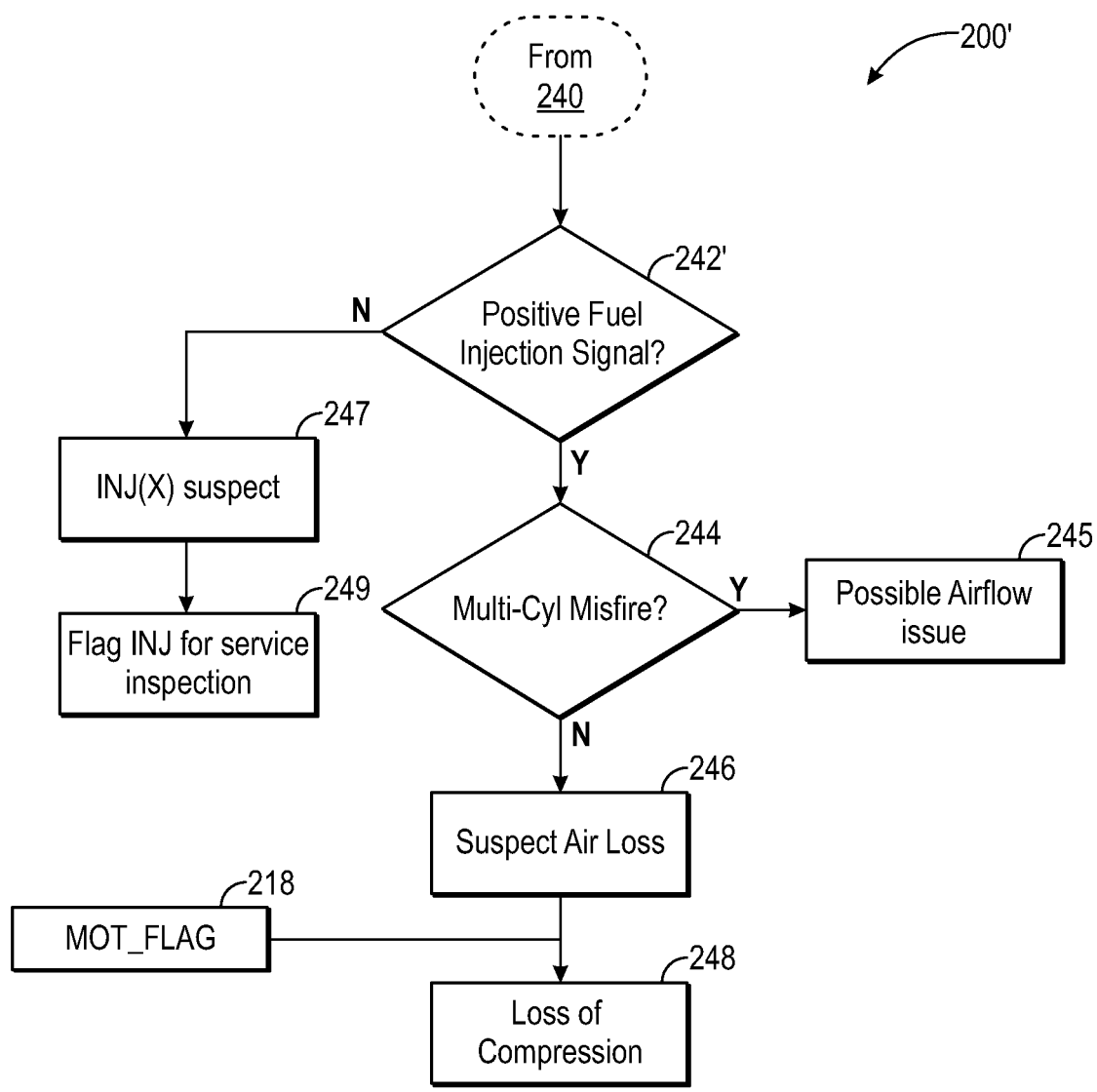
FIGS. 2D-2E are flow diagrams illustrating certain aspects of further forms of example engine diagnostics.
Figure 2E:
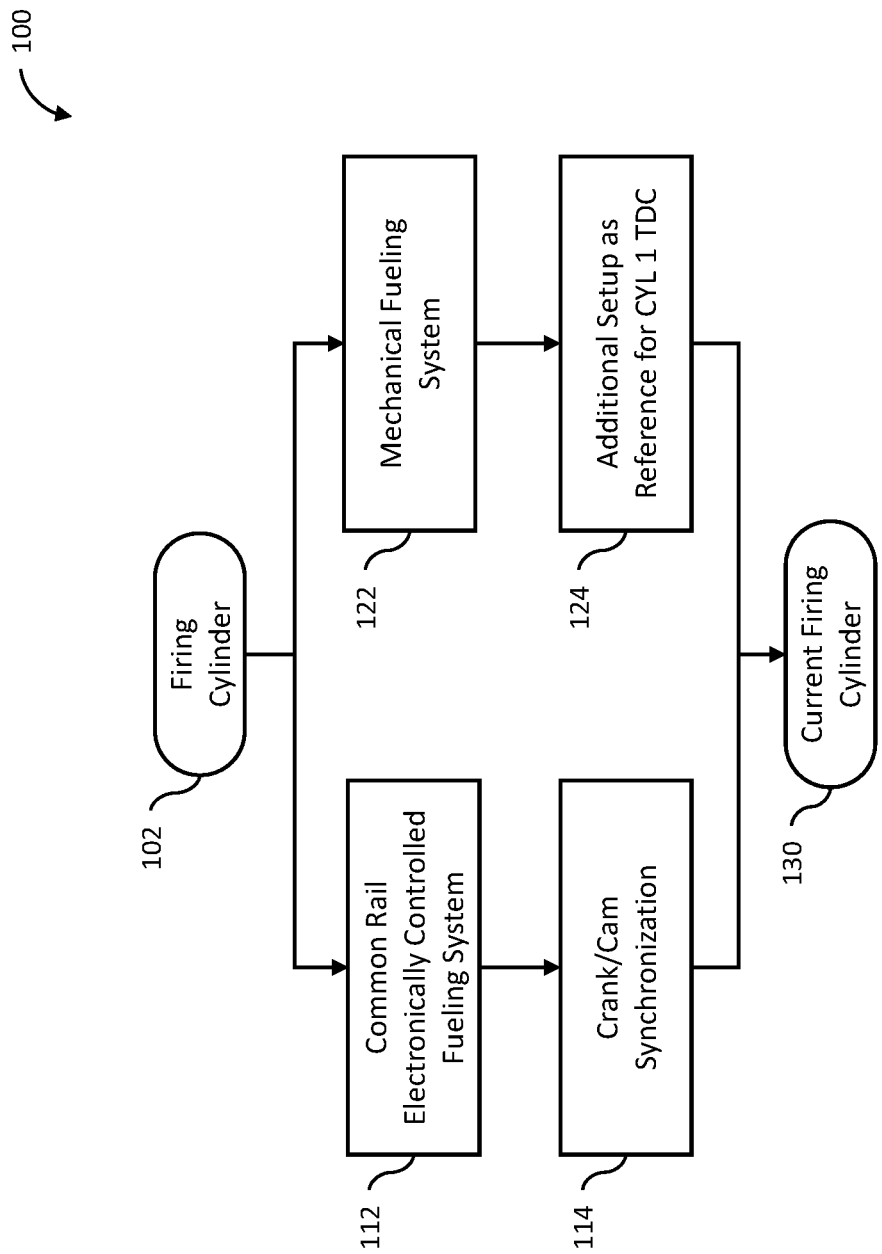

With reference to FIGS. 2D-2E there are illustrated certain aspects of an example engine misfire diagnostic process 200' which may be implemented and executed in connection with one or more components of an electronic control system associated with an engine system, for example, the controller 42 of system 10 described in connection with FIG. 1 or one or more alternative or additional components of an electronic control system as well as in other systems such as a separate diagnostic system or service tool that may be operatively coupled with an engine system and electronic control system thereof and utilized to diagnose or detect failed cylinders or injector. It shall be appreciated that the engine misfire diagnostic process 200' is an example illustrating extension of the engine misfire diagnostic process 200 to additional systems such as the aforementioned diagnostic systems or service tools, diesel engines with a mechanical fuel system, off-highway vehicles, genstes, and other off-highway applications.

With reference to FIG. 2E, there are illustrated certain aspects of a control logic 100 which may be implemented and used in connection with an engine misfire diagnostic process such as the engine misfire diagnostic process 200' and the electronic control system components associated therewith. Control logic 100 illustrates multiple options for establishing a current firing cylinder variable 130 in response to a cylinder firing variable 102, both of which may be stored in one or more nontransitory, controllable readable memory devices or media. The firing cylinder variable 102 comprises an indication that an engine cylinder is firing. The current firing cylinder variable 130 comprises an indication of which of a plurality of engine cylinders is firing.

In the case of an engine including a common rail or other electronic or electronically controlled fueling system 112, a crank and/or cam synchronization operation 114 may be performed to identify which of a plurality of engine cylinders is firing in response to a cam angle value or crank angle value. The current firing cylinder variable 130 may be established or set in response to such synchronization.

In the case of an engine including mechanical or mechanically controlled fueling system 112, an additional setup operation may be performed to designate or provide a reference allowing identification of a top dead center (TDC) position of at least a first cylinder (e.g., any particular one of a plurality of engine cylinders). The current firing cylinder variable 130 may be established or set in response to such reference and identification.

With further reference to FIG. 2D, Engine misfire diagnostic process 200' includes a number of features which are the same as or substantially similar to those of engine misfire diagnostic process 200 illustrated and described in connection with FIGS. 2A-2C. In the interest of brevity, a number of such features are not repetitively illustrated or described for engine misfire diagnostic process 200'. Nevertheless, the description of such features, including, for example, those illustrated and described in connection with FIGS. 2A and 2B, shall be understood to apply to the engine misfire diagnostic process 200' except as otherwise indicated below.

With reference to FIG. 2D there are illustrated certain aspects of the engine misfire diagnostic process 200' varying from engine misfire diagnostic process 200. For example, process 200' proceeds from operation 240, to operation 242' which evaluates whether a positive fuel injection signal is observed. As described above, in some systems, for example, common rail fuel systems, the positive fuel injection signal may comprise a fuel rail pressure drop which may be measured during the injection window of a given cylinder. In other forms, the positive fuel injection signal may comprise an electrical signature, such as an injector firing signature. In further forms, the positive fuel injection signal may be a rail pressure rise, such as can occur in some engines comprising mechanical fueling systems wherein a faulty injection leads to a rise in fuel pressure.

Operation 242' may be performed for each of a plurality of cylinders of an engine and may be performed in a sequence corresponding to the firing order of the plurality of cylinders, in parallel for multiple cylinders, or combinations thereof such as a sequence of parallel evaluations. The positive fuel injection signal may be measured during the injection window of an injector associated with a cylinder under evaluation. The absence of an expected positive fuel injection signal may be taken as an indication of injector malfunction. Accordingly, if operation 242' evaluates that an expected positive fuel injection signal is not observed (e.g., no positive fuel injection signal is observed, or a positive fuel injection signal less than an expected value or threshold is observed), process 200' proceeds to operation 247 at and from which process 200' proceed as described above. If operation 242' evaluates that an expected positive fuel injection signal is observed (e.g., a positive fuel injection signal is observed, or a positive fuel injection signal greater than an expected value or threshold is observed), process 200' proceeds to operation 244 at and from which process 200' proceed as described above.

It shall be appreciated that the evaluation of a positive fuel injection signal may be omitted in certain embodiments, for example, in embodiments which do not have injectors associated with each cylinder, such as port injected engines or engines that introduce fuel at various locations upstream from the cylinders, for example, in the case of certain gaseous fuel engines or multi-fuel engines including gaseous fueling, or in embodiments where injection is commanded mechanically without any electrical command or feedback.

Figure 3:
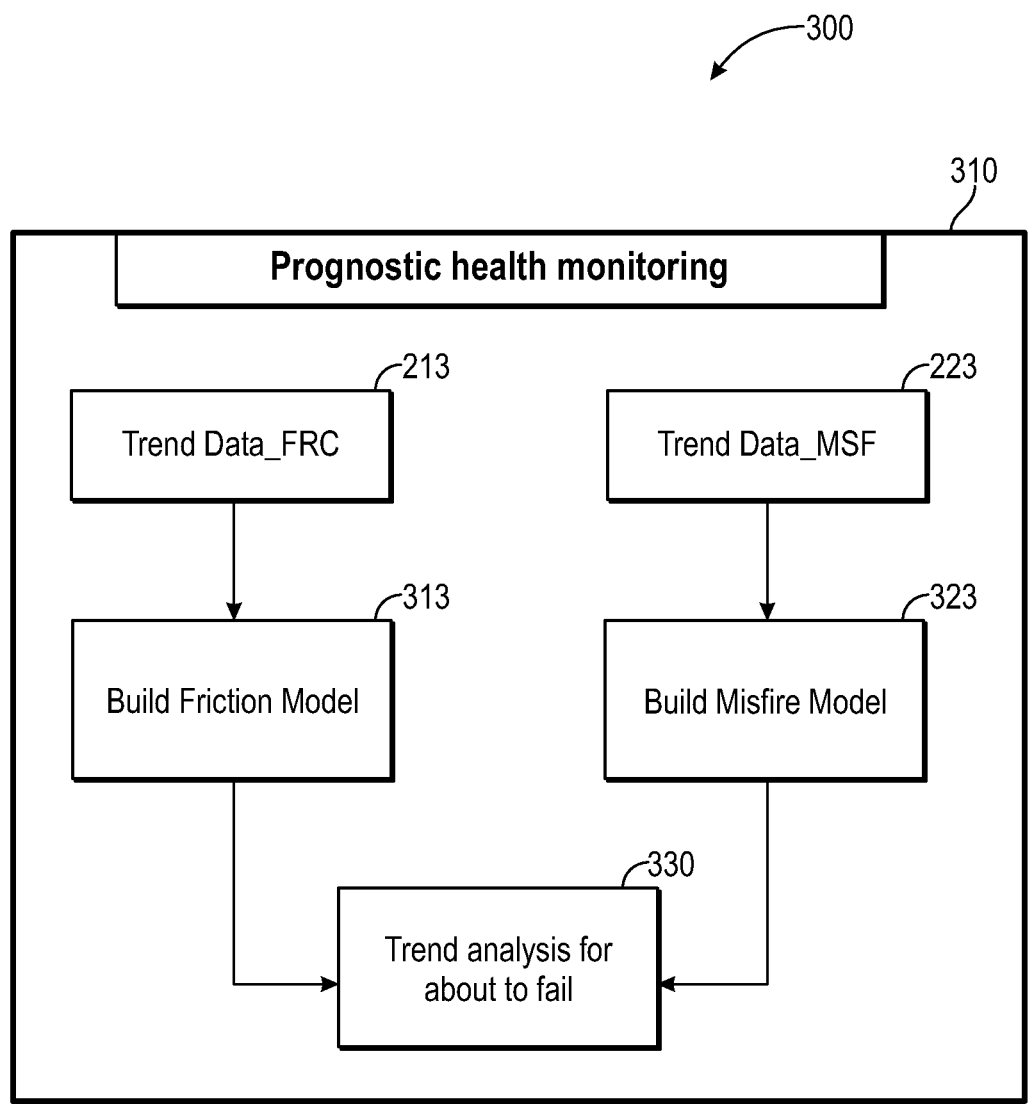
FIG. 3 is a schematic diagram illustrating certain aspects of example engine health prognostics.

With reference to FIG. 3, there is illustrated an example engine misfire prognostic system 300 which may be implemented and executed in connection with a prognostic component 310 which may comprise one or more components of a computing system associated with an engine system, for example, the controller 42 of system 10 described in connection with FIG. 1, an off-engine electronic control system computing system, or one or more alternative or additional computing systems. Prognostic component 310 receives cylinder friction trend data set 213 and utilizes it to build friction model 313. Prognostic component 310 also receives and misfire trend data set 223 and utilizes it to build misfire model 323. Prognostic component 310 further includes a trend analysis block 330 which utilizes friction model 313 and misfire model 323 to predict a future failure event for the engine. It shall be appreciated that engine misfire prognostic system 300 is an example of a system operable to detect a maintenance action for the engine in response to multiple misfire detections.

Figure 4A:
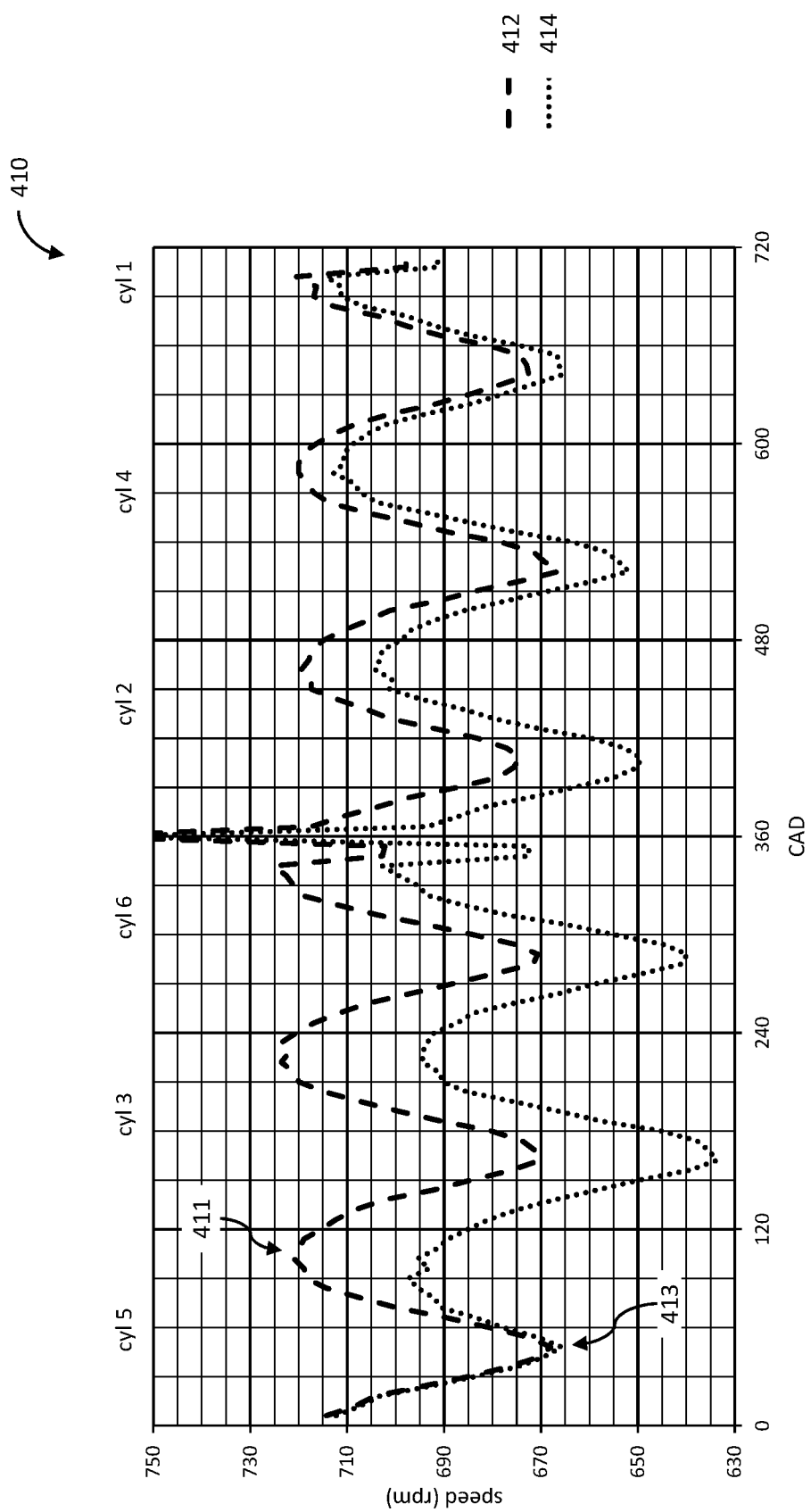
FIGS. 4A-4C are graphs illustrating certain aspects of an example misfire detection technique.
Figure 4B:
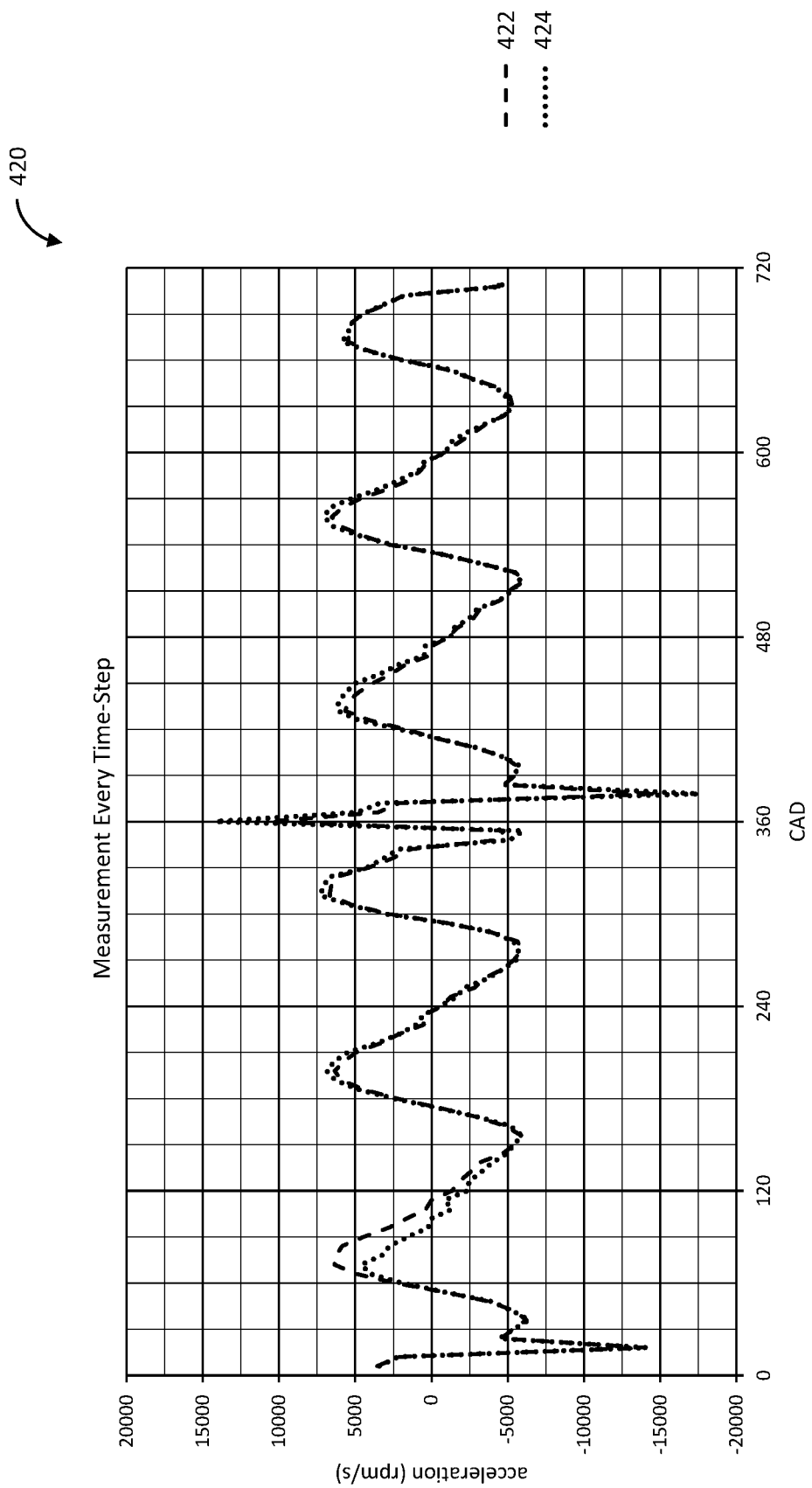
Figure 4C:
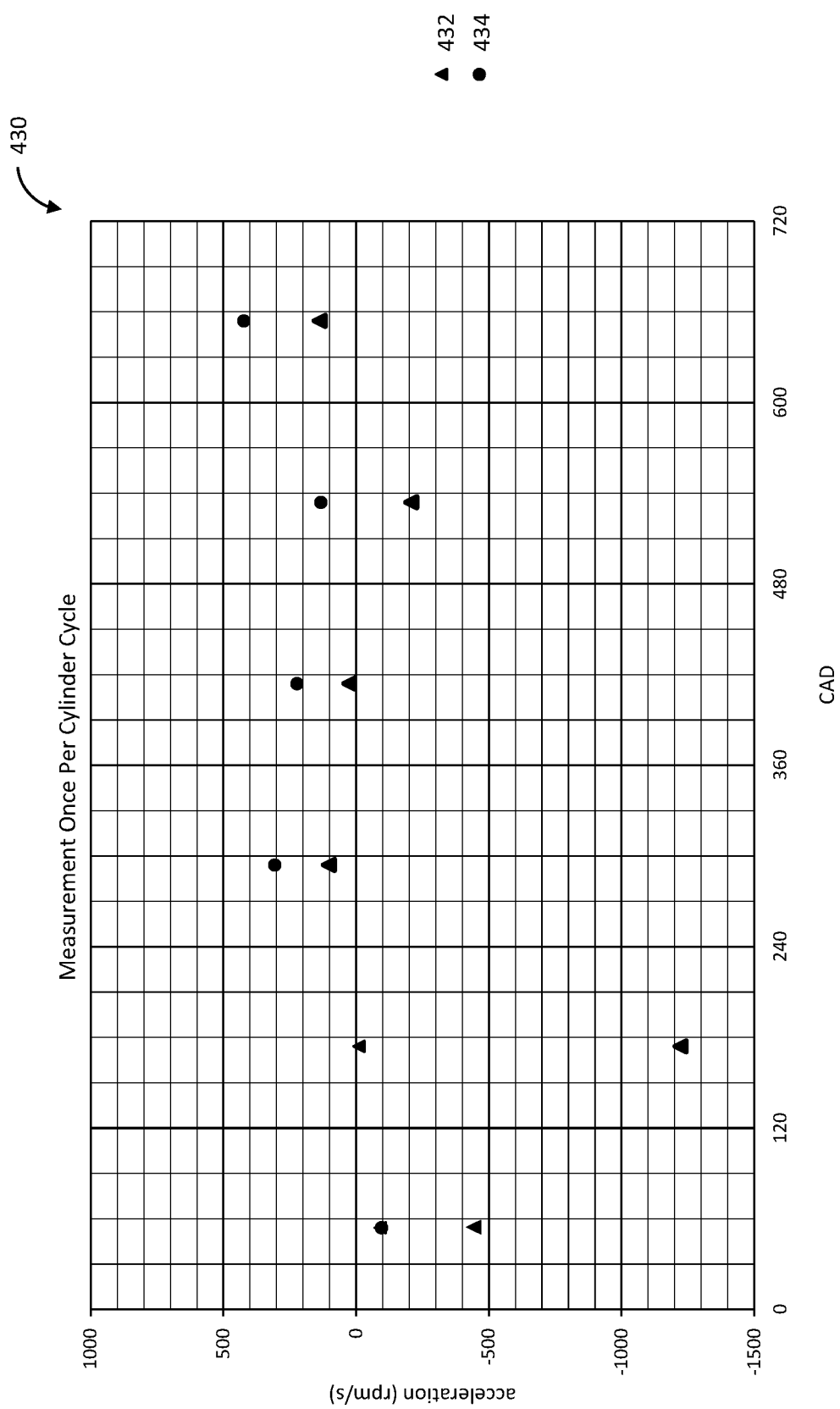

With reference to FIGS. 4A, 4B, and 4C, there are illustrated graphs 410, 420, and 430 illustrating certain aspects of an example misfire detection technique. Graph 410 illustrates engine speed (rpm) on its vertical axis and crank angle degrees (CAD) on its horizontal axis and also indicates firing regions and firing order for each a six cylinders, the firing order being cyl 5, cyl 3, cyl 6, cyl 2, cyl 4, and cyl 1 in the illustrated embodiment. Graph 410 further illustrates a crank angle sensor signal 412 for an engine with each cylinder firing correctly and a crank angle sensor signal 414 for an engine with a cylinder misfire. Crank angle sensor signals 412 and 414 include a plurality of firing peaks which are maximum engine speeds for firing events for individual cylinders, for example, firing peak 411 of signal 412 corresponds to a firing peak for the fifth cylinder (cyl 5) of the example engine. Crank angle sensor signals 412 and 414 include a plurality of compression valleys which are minimum engine speeds for compression events for individual cylinders, for example, compression valley 413 of signal 412 corresponds to a compression valley for the fifth cylinder (cyl 5) of the example engine. As illustrated in graph 410, engine speed from a crankshaft speed sensor shows oscillations when plotted in the crank angle domain. By comparing signals 412 and 414 it can be seen that when a misfire occurs, the firing peak cannot recover speed and a subsequent cylinder compression valley shows a significant dip compared to the previous cycle. Thus, by monitoring engine changes in engine speed (i.e., acceleration) over a cycle, misfiring can be detected and distinguished from healthy cylinder firing.

Graph 420 illustrates engine acceleration (rpm/s) on its vertical axis and crank angle degrees (CAD) on its horizontal axis. Graph 420 further illustrates a determined engine acceleration 422 for an engine with each cylinder firing correctly and a determined engine acceleration 424 for an engine with a cylinder misfire. In the example of graph 420, engine acceleration is calculated at every available time step comprising multiple samples for each cylinder firing and compression event. Graph 430 illustrates engine acceleration (rpm/s) on its vertical axis and crank angle degrees (CAD) on its horizontal axis. Graph 430 further illustrates a determined engine acceleration values 432 for an engine with each cylinder firing correctly and a determined engine acceleration values 434 for an engine with a cylinder misfire. In the example of graph 420, engine acceleration is calculated at every available time step comprising multiple samples for each cylinder firing and compression event. By comparing graphs 420 and 430 it can be seen that determining acceleration over a single cylinder cycle enhances the separation between engine misfire events and healthy engine firing events enhancing the ability to detect misfire events. It can also be seen that determining engine acceleration for a compression valley further enhances the separation between engine misfire events and healthy engine firing events enhancing the ability to detect misfire events.

Figure 5:
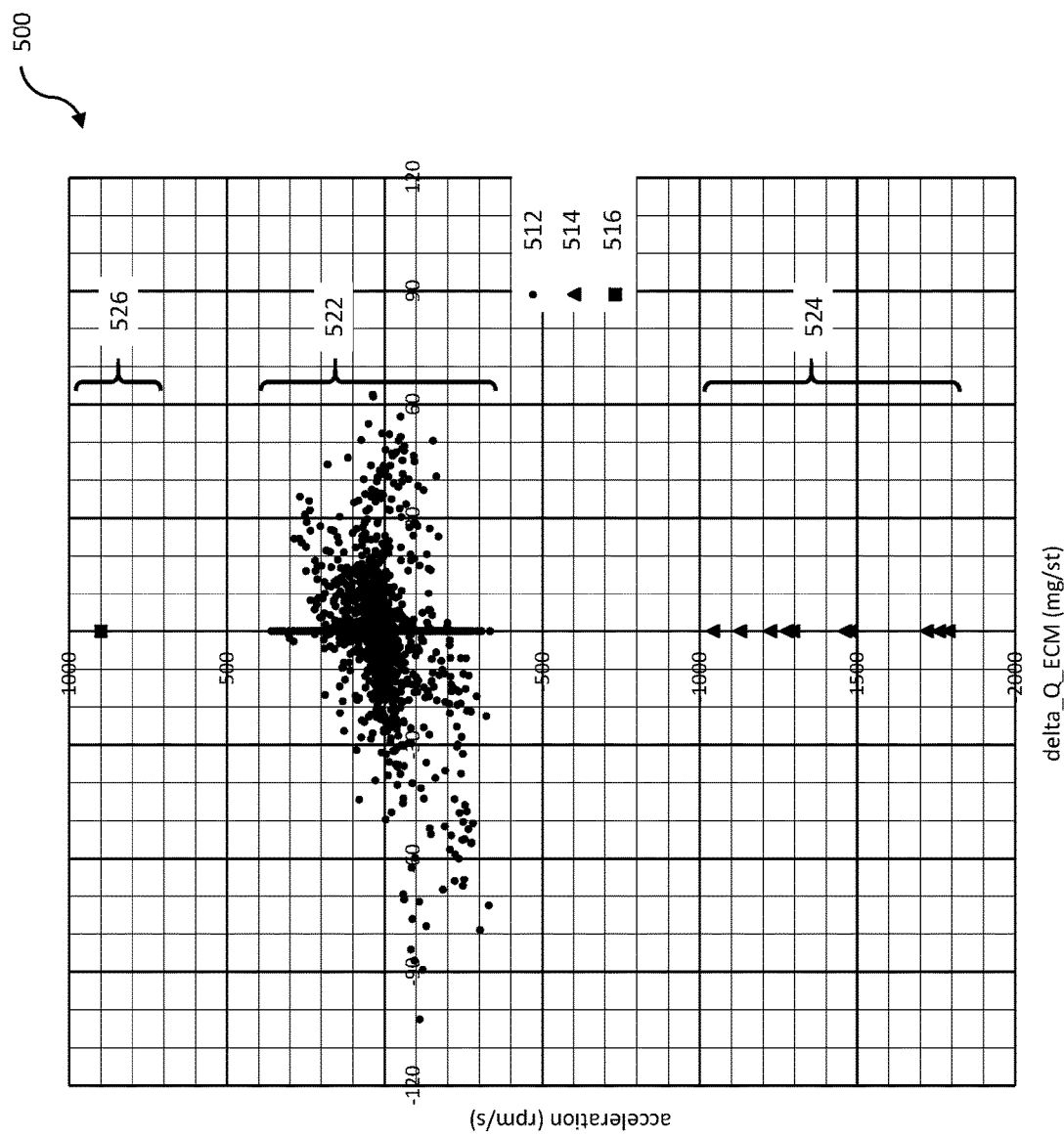
FIG. 5 is a graph illustrating certain aspects of an example misfire detection technique.

With reference to FIG. 5, there is illustrated a graph 500 illustrating certain aspects of an example misfire detection technique. Graph 500 illustrates engine acceleration (rpm/s) on its vertical axis and the difference in fuel quantity between a current and previous firing cylinder cycle (mg/stroke) on its horizontal axis. Graph 500 further illustrates a plurality of data points 512 for cylinders firing correctly at a plurality of different engine fueling amounts, a plurality of data points 514 for misfiring cylinders, and a data point 516 for a cylinder with detonation after misfire. From graph 500 it can be seen that the magnitude of acceleration due to load/speed changes is much lower magnitude than due to misfire. Thus, comparing fueling with the preceding cycle (X-axis) can help filter cases of sudden fueling drop. For example, acceleration over 6 cylinders (720 CAD) can be compared to acceleration over 1 cylinder (120 CAD) to distinguish slow speed change (indicating healthy firing) and fast speed change (indicating misfire). From graph 500 it can also be seen that the magnitude of acceleration for a misfire is much greater in magnitude than the magnitude of acceleration due to load/speed changes. Thus, it is possible to define regions using graph 500 which indicates normal healthy cylinder firing (e.g., region 512), cylinder misfire (e.g., region 514), and cylinder detonation (e.g., region 516).

Figure 6:
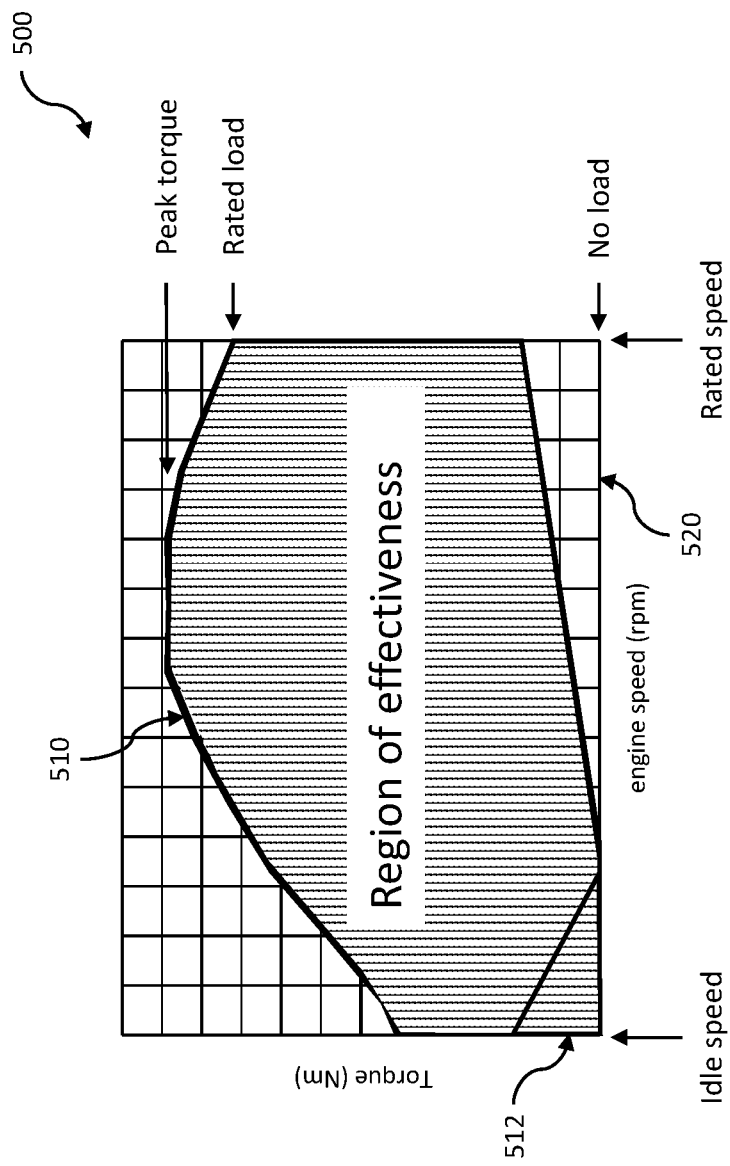
FIG. 6 is a graph illustrating certain aspects of an example misfire detection technique.

With reference to FIG. 6, there is illustrated a graph 600 illustrating certain aspects of an example misfire detection technique. Graph 600 illustrates engine output (torque) on its vertical axis and engine speed (rpm) on its horizontal axis. Graph 600 further illustrates a region of effectiveness 510 (including sub-region 512) in which engine misfire diagnostics according to the present disclosure may be performed effectively. It shall be appreciated that the region of effectiveness 510 includes all of the area under the engine torque curve except for the high-speed, low-load region. It shall be further appreciated that the region of effectiveness 510 includes operation at idle speed and all loads, rated speed (except for low loads in region 520), peak torque, and rated torque. The range of region of effectiveness 510 works during in-mission operation, in both steady state and transient operation. It shall be further appreciated that sub-region 512 of the region of effectiveness 510 is an example of a region in which exhaust manifold pressure-based misfire diagnostic are ineffective due to weak exhaust pulsation, whereas engine misfire diagnostics according to the present disclosure are effective in sub-region 512. The inventors have determined that filtering the determined engine acceleration (e.g., using a three-point moving average, or another soothing technique) may further enhance the detection of misfire at higher engine speeds.

From the present disclosure, it shall be appreciated that the present disclosure encompasses a plurality of embodiments including the following examples. A first example embodiment is a system comprising: a reciprocating piston engine configured to output torque to drive a load; an engine speed sensor operatively coupled with the engine and configured to output an engine speed signal; an electronic control system in communication with the engine and configured to receive the engine speed signal during operation of the engine, and during operation of the engine, determine an engine acceleration in response to the engine speed signal and detect a misfire of the engine in response to the engine acceleration.

In some forms of the first example embodiment, the electronic control system is configured and operable to control operation of the engine in response to a demand load. In some forms of the first example embodiment, the electronic control system is configured to detect the misfire during transient operation of the engine according to a load demand. In some forms of the first example embodiment, the electronic control system is configured to identify a cause of the misfire. In some forms of the first example embodiment, the electronic control system is configured to distinguish between (a) an injector malfunction, (b) an airflow malfunction, and (c) a compression malfunction as the cause of the misfire. In some forms of the first example embodiment, the electronic control system is configured to detect the misfire over a range of engine operation including engine operation at idle speed and idle torque, operation at rated speed and rated torque, and operation at maximum speed and maximum torque. In some forms of the first example embodiment, the electronic control system is configured to detect the misfire in response to an output of an engine speed sensor in one of a peak and a valley of an engine speed signal provided by the engine speed sensor. In some forms of the first example embodiment, the electronic control system is configured to detect the misfire in response to a single engine speed measurement for each cylinder cycle. In some forms of the first example embodiment, the single engine speed measurement corresponds to a valley of an engine speed signal. In some forms of the first example embodiment, at least one of: (a) the electronic control system is configured to predict a maintenance action for the engine in response to multiple misfire detections; (b) the electronic control system is configured to operate a diagnostic configured to monitors engine health over time and to output prognostic recommendations; and (c) the electronic control system monitors engine health over time and makes prognostic recommendations based on trends in at least one of cylinder firing and mechanical degradation. In some forms of the first example embodiment, the electronic control system is configured to at least one of: modify operation of the engine in response to determination of the misfire of the engine, and provide an operator perceptible output indicating a maintenance action. In some forms of the first example embodiment, detection of the misfire of the engine in response to the engine acceleration is performed in a component of the electronic control system provided on-board the engine. In some forms of the first example embodiment, the engine comprises a mechanical fueling system. In some forms of the first example embodiment, the engine comprises an electronic fueling system. In some forms of the first example embodiment, detection of the misfire of the engine in response to the engine acceleration is performed in an off-board diagnostic system component of the electronic control system which is separate from and is configured to be operatively coupled with a component of the electronic control system provided on-board the engine.

A second example embodiment is a method comprising: operating a system including a reciprocating piston engine configured to output torque to drive a load, an engine speed sensor operatively coupled with the engine and configured to output an engine speed signal, and an electronic control system in communication with the engine speed sensor; operating the electronic control system to receive the engine speed signal during operation of the engine, and during operation of the engine, determining with the electronic control system an engine acceleration in response to the engine speed signal and detecting a misfire of the engine with the electronic control system in response to the engine acceleration.

In some forms of the second example embodiment, the act of detecting the misfire of the engine with the electronic control system in response to the engine acceleration includes detecting the misfire during transient operation of the engine according to the load demand. In some forms of the second example embodiment, the method comprises identifying with the electronic control system a cause of the misfire. In some forms of the second example embodiment, the act of identifying with the electronic control system a cause of the misfire comprises distinguishing with the electronic control system between (a) an injector malfunction, (b) an airflow malfunction, and (c) a compression malfunction as the cause of the misfire. In some forms of the second example embodiment, the act of detecting the misfire of the engine with the electronic control system in response to the engine acceleration includes detecting the misfire over a range of engine operation including engine operation at idle speed and idle torque, operation at rated speed and rated torque, and operation at maximum speed and maximum torque. In some forms of the second example embodiment, the act of detecting the misfire of the engine with the electronic control system in response to the engine acceleration includes detecting the misfire in response to an output of an engine speed sensor in one of a peak and a valley of an engine speed signal provided by the engine speed sensor. In some forms of the second example embodiment, the method comprises detecting the misfire in response to a single engine speed measurement for each cylinder cycle. In some forms of the second example embodiment, the single engine speed measurement corresponds to a valley of an engine speed signal. In some forms of the second example embodiment, the method comprises at least one of: (a) predicting a maintenance action for the engine in response to multiple misfire detections; (b) operating a diagnostic configured to monitors engine health over time and to outputting prognostic recommendations; and (c) monitoring engine health over time and making prognostic recommendations based on trends in at least one of cylinder firing and mechanical degradation. In some forms of the second example embodiment, the method comprises operating the electronic control system to at least one of: modify operation of the engine in response to determination of the misfire of the engine, and provide an operator perceptible output indicating a maintenance action. In some forms of the second example embodiment, the method is performed by a component of the electronic control system provided on-board the engine. In some forms of the second example embodiment, the engine comprises a mechanical fueling system. In some forms of the second example embodiment, the engine comprises an electronic fueling system. In some forms of the second example embodiment, the method is performed at least in part by an off-board diagnostic system component of the electronic control system which is separate from and is configured to be operatively coupled with a component of the electronic control system provided on-board the engine.

A third example embodiment is a computer apparatus for performing diagnostics on a reciprocating piston engine, the computer apparatus comprising: an interface configured to be communicatively coupled with the engine and to receive information indicating an engine speed, and a processor configured to execute instructions stored in a non-transitory computer-readable memory medium to process the information indicating the engine speed, determine an engine acceleration in response to the information indicating the engine speed, and detect a misfire of the engine in response to the engine acceleration.

In some forms of the third example embodiment, the processor is provided as a component of a stand-alone diagnostic apparatus. In some forms of the third example embodiment, the processor is configured to be operatively coupled with a mechanically controlled engine. In some forms of the third example embodiment, the processor is provided as a component of an on-engine system. In some forms of the third example embodiment, the processor is configured to detect the misfire during transient operation of the engine according to the load demand. In some forms of the third example embodiment, the processor is configured to identify a cause of the misfire. In some forms of the third example embodiment, the processor is configured to distinguish between (a) an injector malfunction, (b) an airflow malfunction, and (c) a compression malfunction as the cause of the misfire. In some forms of the third example embodiment, the processor is configured to detect the misfire over a range of engine operation including engine operation at idle speed and idle torque, operation at rated speed and rated torque, and operation at maximum speed and maximum torque. In some forms of the third example embodiment, the processor is configured to detect the misfire in response to an output of an engine speed sensor in one of a peak and a valley of an engine speed signal provided by the engine speed sensor. In some forms of the third example embodiment, the processor is configured to detect the misfire in response to a single engine speed measurement for each cylinder cycle. In some forms of the third example embodiment, the single engine speed measurement corresponds to a valley of an engine speed signal.

From the foregoing description, it shall be appreciated that some example embodiments include one or more unique features that, while not essential or required of all embodiments, provide unique aspects of certain embodiments. Some embodiments utilize an engine speed sensor, such as an engine crankshaft sensor, without requiring any additional sensors. Some embodiments, utilize an engine speed sensor in combination with an exhaust manifold pressure (EMP) sensor to complement an EMP-based misfire diagnostic. Some embodiments operate during in-mission engine operation without requiring particular test modes or operation. Some embodiments distinguish transient engine load noise from misfire events. Some embodiments provide diagnostics that operate effectively over a majority of the speed-torque domain of an engine operating map. Some embodiments, identify a cause for misfire and/or distinguish between multiple potential causes for misfire. Some embodiments provide prognostics for engine health monitoring and/or predictive maintenance. Some embodiments include aspects of the foregoing example embodiment in combination with one another and/or in combination with other aspects and features of the foregoing description.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a reciprocating piston engine configured to output torque to drive a load;
an engine speed sensor operatively coupled with the engine and configured to output an engine speed signal;
an electronic control system in communication with the engine and configured to receive the engine speed signal during operation of the engine, determine an engine acceleration based on the engine speed signal, determine whether the engine is operating in one of a steady state condition, a transient condition, and a high-load and high-speed condition, and determine a misfire of the engine based on: the engine speed signal if the engine is operating in the steady condition, the engine acceleration if the engine is operating in the transient condition, and an exhaust manifold pressure-based diagnostic if the engine is operating in the high-load and high-speed condition.

2. The system of claim 1, wherein the electronic control system is configured to detect the misfire during transient operation of the engine according to a load demand.

3. The system of claim 1, wherein the electronic control system is configured to identify a cause of the misfire.

4. The system of claim 3, wherein the electronic control system is configured to distinguish between (a) an injector malfunction, (b) an airflow malfunction, and (c) a compression malfunction as the cause of the misfire.

5. The system of claim 1, wherein the electronic control system is configured to detect the misfire over a range of engine operation including engine operation at idle speed and idle torque, operation at rated speed and rated torque, and operation at maximum speed and maximum torque.

6. The system of claim 1, wherein the electronic control system is configured to detect the misfire in response to an output of an engine speed sensor in one of a peak and a valley of an engine speed signal provided by the engine speed sensor.

7. The system of claim 1, wherein the electronic control system is configured to detect the misfire in response to a single engine speed measurement for each cylinder cycle.

8. The system of claim 7, wherein the single engine speed measurement corresponds to a valley of an engine speed signal.

9. The system of claim 1, wherein at least one of: (a) the electronic control system is configured to predict a maintenance action for the engine in response to multiple misfire detections; (b) the electronic control system is configured to operate a diagnostic configured to monitors engine health over time and to output prognostic recommendations; and (c) the electronic control system monitors engine health over time and makes prognostic recommendations based on trends in at least one of cylinder firing and mechanical degradation.

10. The system of claim 1, wherein the electronic control system is configured to at least one of: modify operation of the engine in response to determination of the misfire of the engine, and provide an operator perceptible output indicating a maintenance action.

11. A method comprising:
operating a system including a reciprocating piston engine configured to output torque to drive a load, an engine speed sensor operatively coupled with the engine and configured to output an engine speed signal, and an electronic control system in communication with the engine speed sensor;
operating the electronic control system during operation of the engine to perform the acts of: receiving the engine speed signal, determining whether the engine is operating in one of a steady state condition, a transient condition, and a high-load and high-speed condition, and one of: (a) if the engine is operating in the steady condition detecting a misfire of the engine in response to the engine speed signal, (b) if the engine is operating in the transient condition determining an engine acceleration in response to the engine speed signal and detecting a misfire of the engine in response to the engine acceleration, and (c) if the engine is operating in the high-load and high-speed condition detecting a misfire of the engine in response to an exhaust manifold pressure-based diagnostic.

12. The method of claim 11, wherein the act of detecting the misfire of the engine in response to the engine acceleration includes detecting the misfire during transient operation of the engine according to the load demand.

13. The method of claim 11, comprising identifying with the electronic control system a cause of the misfire.

14. The method of claim 13, wherein the act of identifying with the electronic control system a cause of the misfire comprises distinguishing with the electronic control system between (a) an injector malfunction, (b) an airflow malfunction, and (c) a compression malfunction as the cause of the misfire.

15. The method of claim 11, wherein the act of detecting the misfire of the engine in response to the engine acceleration includes detecting the misfire over a range of engine operation including engine operation at idle speed and idle torque, operation at rated speed and rated torque, and operation at maximum speed and maximum torque.

16. The method of claim 11, wherein the act of detecting the misfire of the engine in response to the engine acceleration includes detecting the misfire in response to an output of an engine speed sensor in one of a peak and a valley of an engine speed signal provided by the engine speed sensor.

17. The method of claim 11, comprising detecting the misfire in response to a single engine speed measurement for each cylinder cycle.

18. The method of claim 17, wherein the single engine speed measurement corresponds to a valley of an engine speed signal.

19. The method of claim 11, comprising at least one of: (a) predicting a maintenance action for the engine in response to multiple misfire detections; (b) operating a diagnostic configured to monitors engine health over time and to outputting prognostic recommendations; and (c) monitoring engine health over time and making prognostic recommendations based on trends in at least one of cylinder firing and mechanical degradation.

20. The method of claim 11, comprising operating the electronic control system to at least one of: modify operation of the engine in response to determination of the misfire of the engine, and provide an operator perceptible output indicating a maintenance action.

21. A computer apparatus for performing diagnostics on a reciprocating piston engine, the computer apparatus comprising:
an interface configured to be communicatively coupled with the engine and to receive information indicating an engine speed, and
a processor configured to execute instructions stored in a non-transitory computer-readable memory medium to:
determine an engine acceleration in response to the information indicating the engine speed,
determine whether the engine is operating in one of a steady state condition, a transient condition, and a high-load and high-speed condition, and
detect a misfire of the engine in response to: the engine speed signal if the engine is operating in the steady condition, the engine acceleration if the engine is operating in the transient condition, and an exhaust manifold pressure-based diagnostic if the engine is operating in the high-load and high-speed condition.

22. The computer apparatus of claim 21, wherein the processor is configured to detect the misfire during transient operation of the engine according to the load demand.

23. The computer apparatus of claim 21, wherein the processor is configured to identify a cause of the misfire.

24. The computer apparatus of claim 23, wherein the processor is configured to distinguish between (a) an injector malfunction, (b) an airflow malfunction, and (c) a compression malfunction as the cause of the misfire.

25. The computer apparatus of claim 21, wherein the processor is configured to detect the misfire over a range of engine operation including engine operation at idle speed and idle torque, operation at rated speed and rated torque, and operation at maximum speed and maximum torque.

26. The computer apparatus of claim 21, wherein the processor is configured to detect the misfire in response to an output of an engine speed sensor in one of a peak and a valley of an engine speed signal provided by the engine speed sensor.

27. The computer apparatus of claim 21, wherein the processor is configured to detect the misfire in response to a single engine speed measurement for each cylinder cycle.

28. The computer apparatus of claim 27, wherein the single engine speed measurement corresponds to a valley of an engine speed signal.

* * * * *